(12) United States Patent
Majewicz et al.

(10) Patent No.: US 7,991,281 B1
(45) Date of Patent: Aug. 2, 2011

(54) ILLUMINATION SOURCE HAVING PROGRAMMABLE RISE AND FALL TIMES

(75) Inventors: Peter Majewicz, Boise, ID (US); Brad Smith, Boise, ID (US); Kurt E Spears, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 12/727,630

(22) Filed: Mar. 19, 2010

(51) Int. Cl.
   *G03B 15/03* (2006.01)
   *G03B 27/72* (2006.01)
   *G03G 15/043* (2006.01)
   *H05B 37/02* (2006.01)

(52) U.S. Cl. ............ 396/164; 348/371; 355/68; 355/69; 315/158; 396/182; 399/220

(58) Field of Classification Search .................. 396/164, 396/182; 348/370, 371; 399/220; 355/68, 355/69; 315/158, 307
See application file for complete search history.

(56) References Cited

U.S. PATENT DOCUMENTS

| 5,739,847 A * | 4/1998 | Tranchita et al. ............. 348/143 |
| 2006/0033835 A1 * | 2/2006 | Pollard et al. .................. 348/370 |
| 2009/0153063 A1 * | 6/2009 | Sudo ............................. 315/158 |

OTHER PUBLICATIONS

"A Slave Flash Trigger Unit for Underground Photography", Cambridge Underground, 1977, pp. 66-67.

* cited by examiner

Primary Examiner — W. B. Perkey

(57) ABSTRACT

An illumination source senses a level of ambient light and determines an illumination waveform to be used to illuminate at least a portion of a document. The rise and the fall time of the illumination waveform are independently controlled.

19 Claims, 3 Drawing Sheets

ILLUMINATION SOURCE HAVING PROGRAMMABLE RISE AND FALL TIMES

BACKGROUND

In many office environments, obtaining a desirable workspace can be problematic. Office workers generally seek a quiet place where they can perform their duties with minimal interruptions from coworkers, office machines, and so forth. One example of such an interruption can be an office copy machine that makes use of a bright light to copy or scan a document. Often, stray light from such a copying device presents a distraction to office workers in the immediate area. These distractions reduce productivity and can degrade the overall quality of the office environment.

DESCRIPTION OF THE EMBODIMENTS

An illumination source having programmable rise and fall times can be used with various image capture devices, such as copy machines, document scanners, and document cameras to reduce the distracting effect of stray light emanating from the image capture device. Embodiments of the invention "soften" the illumination waveform so that the intensity of the illumination source is more gradually increased from 0 to a maximum value and then gradually reduced back to 0. The slower onset and more gradual termination of the illumination source is less distracting than the fast-onset "flash" used to illuminate documents in many conventional image capture devices.

Figure 1:
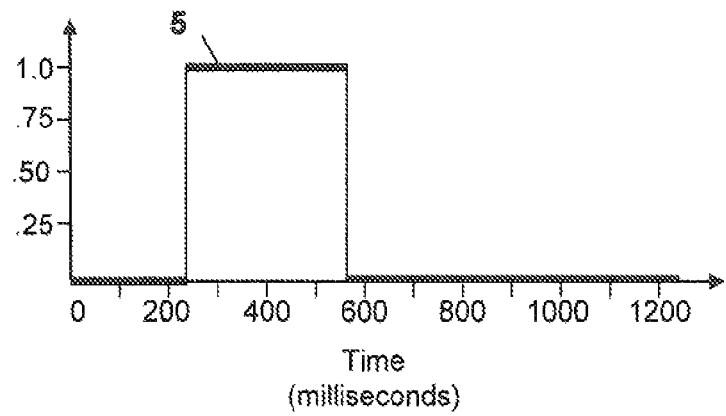
FIG. 1 is a waveform representing the illumination source intensity versus time of a device used to illuminate a document according to the prior art.

FIG. 1 is a waveform representing the illumination source intensity versus time of a device used to illuminate a document according to the prior art. In FIG. 1, normalized illumination source intensity 5 maintains a value of 0 until a time of approximately 250 milliseconds. At this time, the intensity is brought a normalized value of 1.0 (maximum) until a time of approximately 550 milliseconds. At 550 milliseconds, the normalized illumination source intensity abruptly returns to 0.

As previously mentioned, these abrupt changes in illumination source intensity can be distracting to those in the immediate area of the image capture device. Workers close to these devices may see a sudden flash that can be quite annoying. Over time, especially in an environment where image capture devices are being used frequently, the productivity of the entire office may suffer.

Figure 2:
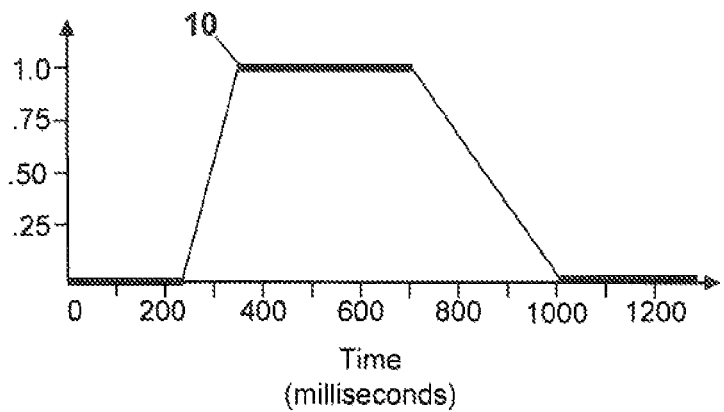
FIG. 2 is a waveform representing the illumination source intensity versus time of a device used to illuminate a document according to an embodiment of the invention.

FIG. 2 is a waveform representing the illumination source intensity versus time of a device used to illuminate a document according to an embodiment of the invention. In FIG. 2, normalized illumination source intensity 10 maintains a value of 0 until a time of approximately 250 milliseconds. From 250 milliseconds until approximately 350 milliseconds, the normalized illumination source intensity is brought from 0 to a maximum value. This maximum value is maintained from approximately 350 milliseconds until 700 milliseconds. At 700 milliseconds, the normalized illumination source intensity is gradually reduced until, at approximately 1000 milliseconds (1 second), the intensity returns to a value near 0.

Although FIG. 1 and FIG. 2 show a waveform in which the illumination source is brought from a 0 value to a maximum value of 1.0 and back to 0 within a time span of roughly 1000 milliseconds (1 second), a vast number of illumination waveforms of other durations may be used. The particular waveform used to illustrate the example of FIG. 2 is merely one embodiment of the invention that the inventors have experimented with and obtained favorable results.

Figure 3:
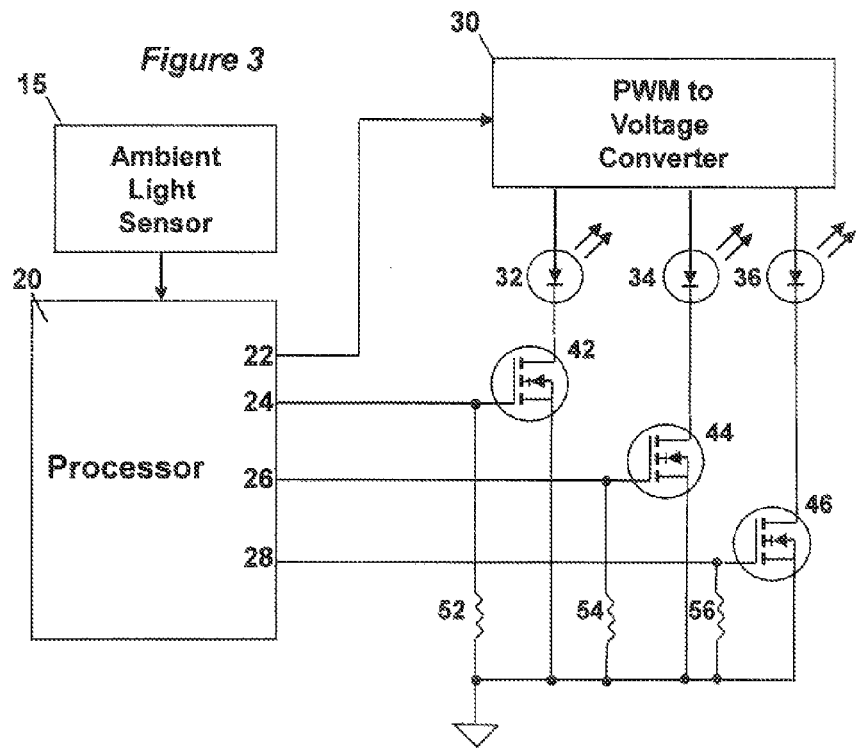
FIG. 3 is a diagram of a circuit used in an illumination source having programmable rise and fall times according to an embodiment of the invention.

FIG. 3 is a diagram of a circuit used in an illumination source having programmable rise and fall times according to an embodiment of the invention. In FIG. 3, ambient light sensor 15 samples the light in the immediate environment of the image capture device. In the event that the image capture device is located in a well-lit area, ambient light sensor 15 returns a corresponding value. In contrast, if the image capture device is located in a dimly-lit area, a significantly different value may be returned from sensor 15. As will be described herein, the use of ambient light sensor 15 allows for the upward or downward adjustment in the intensity of the illumination source used by the image capture device as well as adjusting the rise and fall times of the illumination source.

An output of ambient light sensor 15 is conveyed to processor 20. By way of a lookup table or perhaps by executing an algorithm, the level of ambient light is translated into a pulse-width modulated or other type of control signal at output 22. As previously mentioned, in the event that a low level of ambient light is present, processor 20 would likely select an illumination waveform having relatively slow rise and fall times along with minimal peak illumination. In contrast, in the event that a high level of ambient light is present, processor 20 would likely select an illumination waveform perhaps having faster rise and fall times along with a higher value of peak illumination. In this manner, processor 20 assists in the tailoring of the illumination waveform as influenced by the ambient lighting conditions.

Figure 4:
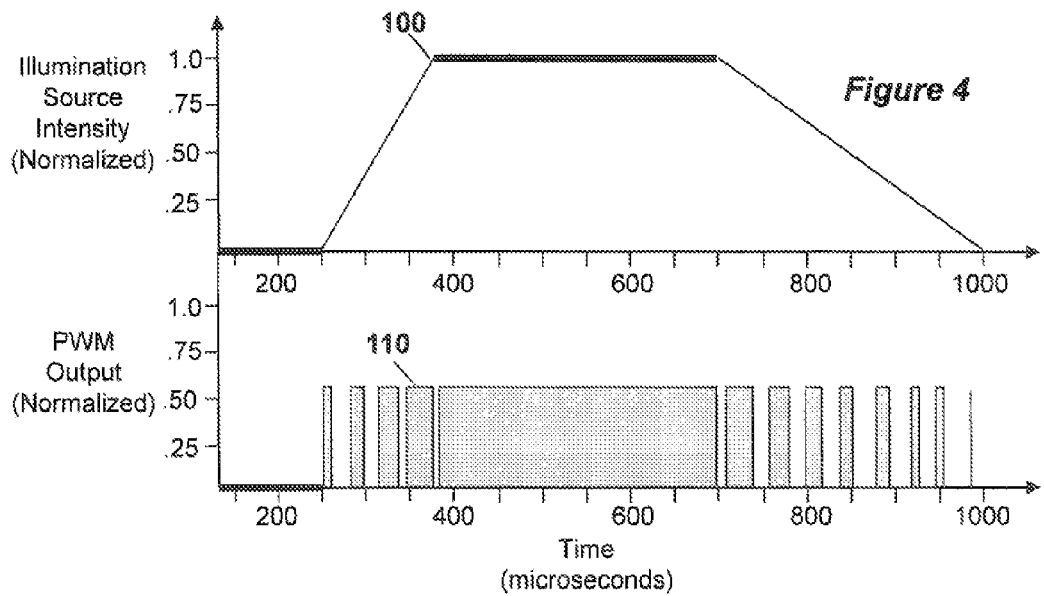
FIG. 4 shows an illumination waveform similar to that of FIG. 2 along with a waveform of a pulse-width modulated signal that brings about the illumination waveform according to an embodiment of the invention.

FIG. 4 shows an illumination waveform similar to that of FIG. 2 along with a waveform of a pulse-width modulated signal that brings about the illumination waveform according to an embodiment of the invention. Waveform 100 at the top half of FIG. 4 tracks waveform 10 of FIG. 2 except that an expanded timescale has been used in the horizontal axis. Thus, as previously described, the normalized illumination source intensity maintains a value of near 0 until 250 milliseconds, increases linearly to a maximum point near 350 milliseconds and maintains a maximum value until approximately 700 milliseconds. At or near 700 milliseconds, the normalized illumination source intensity gradually decreases until a 0 value is reached near 1000 milliseconds.

In the bottom half of FIG. 4, a pulse-width modulated signal that brings about the illumination waveform in the upper half of the figure is shown. As can be seen, pulse-width modulated signal 110 begins at a low duty cycle when the normalized illumination source intensity is low and increases to a 100% duty cycle when the normalized illumination source intensity is high. As the normalized illumination source intensity decreases, the duty cycle of the pulse-width modulated signal correspondingly decreases.

Returning now to the diagram of FIG. 3, the pulse-width modulated signal from output 22 of processor 20 is converted to a voltage using PWM to voltage converter 30. In an embodiment of the invention, PWM to voltage converter 30 operates as buck step-down circuit that outputs a variable voltage as a function of the duty cycle of the pulse-width modulated signal input. Thus, when the pulse-width modulated input presents a signal at 100% duty cycle, a maximum voltage is conveyed from PWM to voltage converter 30 to each of light-emitting diodes 32, 34, and 36. When the pulse-width modulated signal input has less than a 100% duty cycle, a smaller voltage is conveyed to each of the light-emitting diodes.

In the embodiment of FIG. 3, the electrical current through light-emitting diodes 32, 34, and 36 is controlled by way of MOSFETs 42, 44, and 46, respectively. In this embodiment, MOSFET 42 is controlled by output 24, MOSFET 44 is controlled by output 26, and MOSFET 46 is controlled by output 28 of processor 20. Each MOSFET is triggered separately according to the output signal present at outputs 24, 26, and 28. For example, as the normalized illumination source intensity is increasing from 0 and perhaps during an initial portion of the maximum illumination source intensity, output 24 of processor 20 may trigger MOSFET 42, thereby activating light-emitting diode 32. During a middle portion of the maximum illumination source intensity, output 26 of processor 20 may trigger MOSFET 44, thereby activating light-emitting diode 44 while light-emitting diode 32 is deactivated. Finally, during the final portion of the maximum illumination source intensity and as the intensity falls to 0, output 28 of processor 20 may trigger MOSFET 46 thereby activating light-emitting diode 46 while light-emitting diode 34 is deactivated. During the above-identified switching functions, resistors 52, 54, and 56 operate as pull-down resistors that ensure transistors 32, 34, and 36 (respectively) completely deactivate when the output signals from processor 20 are returned to 0.

Figure 5:
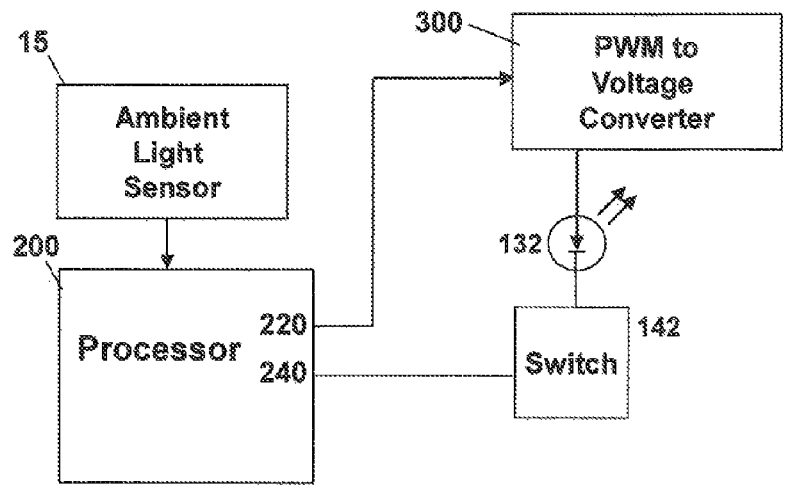
FIG. 5 is a diagram of a circuit used in an illumination source having programmable rise and fall times according to an embodiment of the invention.

Although the embodiment of FIG. 3 makes use of 3 MOSFET switches, other embodiments of the invention may employ a greater number (such as 5 or more) or a lesser number (such as 1 or 2) of switches. For example, FIG. 5 shows a diagram of a circuit used in an illumination source having programmable rise and fall times according to an embodiment of the invention. In FIG. 5, ambient light sensor 15 samples the light in the immediate environment of an image capture device. A signal that represents the level of ambient is conveyed to processor 200. In a manner similar to that used by processor 20 of FIG. 3, processor 200 may select an illumination waveform best suited for use with the amount of ambient light present. A control signal which may take the form of a pulse-width modulated waveform may then be conveyed from output 220 of processor 200 to PWM to voltage converter 300, which may operate similar to that of converter 30 of FIG. 3 except that converter 300 includes only a single step-down voltage output. To activate light-emitting diode 132, switch 142 is triggered by way of output 240 of processor 200. With output 240 of processor 200 triggering switch 142 throughout the entire time period of waveform 100 of FIG. 4, an illumination source having a programmable rise and fall time can be accomplished using only a single light-emitting diode.

It should be noted that although FIGS. 2 and 4 show linearly increasing and decreasing illumination source intensity, embodiments of the invention may exhibit waveforms that follow an exponentially or logarithmically increasing and decreasing profile or may follow any other nonlinear profile. In most embodiments of the invention, it is contemplated that regardless of the particular mathematical function that characterizes rise and fall times of the illumination source intensity waveform, abrupt changes in the intensity are avoided. Additionally, the rise time and the fall time of the intensity waveform can be unequal and independently controlled.

Figure 6:
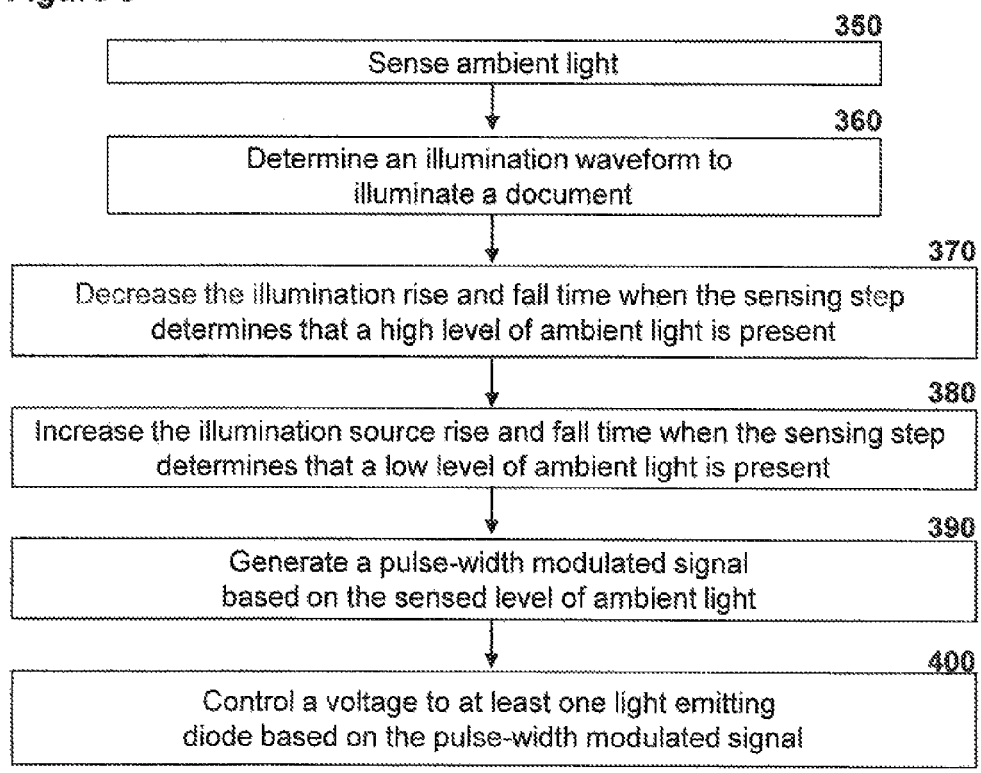
FIG. 6 is a flow chart for a method used by an illumination source having programmable rise and fall times according to an embodiment of the invention.

FIG. 6 is a flow chart for a method used by an illumination source having a programmable rise and fall time according to an embodiment of the invention. Although the embodiments of FIG. 3 and FIG. 5 may be used to perform the method of FIG. 6, a variety of alternate structures may be used to perform the method. The method of FIG. 6 begins at step 350 in which the level of ambient light in an immediate area of an imaging device is sensed. At step 360, an illumination waveform appropriate to illuminate a document is determined. As mentioned previously, in the event that ambient light levels are high, a waveform having a decreased rise time, greater maximum, and decreased fall time may be selected, as in step 370. When the level of ambient light is low, a waveform having an increased rise time, lower maximum, and increased fall-time may be selected, as in step 380. At step 390, a pulse-width modulated signal (or other type of control signal) based on the sensed amount of ambient light is generated and input to an appropriate converter. At step 400, the received signal is converted to a voltage used to activate an illumination source.

In some embodiments of the invention, not all of the steps identified in FIG. 6 may be performed. For example, a method for illuminating at least a portion of a document may include sensing an amount of ambient light (as in step 350) and determining an illumination waveform to be used to illuminate the at least a portion of the document (as in step 360). In this embodiment, the illumination waveform possesses an illumination rise time that is different from an illumination fall time.

In conclusion, while the present invention has been particularly shown and described with reference to various embodiments, those skilled in the art will understand that many variations may be made therein without departing from the spirit and scope of the invention as defined in the following claims. This description of the invention should be understood to include the novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element or the equivalent thereof, such claims should be understood to include incorporation of one or more such elements, neither requiring nor excluding two or more such elements.

What is claimed is:

1. An illumination source, comprising:
   a processor that outputs a control signal;
   a converter for converting the control signal to a voltage; and
   at least one switch that, under the control of the processor, permits a current to flow from the converter through an illumination source, wherein
   the rise and fall times of an illumination waveform of the illumination source are controlled independently by the processor.

2. The illumination source of claim 1, wherein the control signal is a pulse-width modulated signal.

3. The illumination source of claim 2, wherein the converter converts the pulse-width modulated signal to a voltage using a buck step-down regulator.

4. The illumination source of claim 1, wherein the rise and fall times of the illumination waveform are unequal.

5. The illumination source of claim 4, wherein the rise time of the illumination waveform is greater than 100 milliseconds.

6. The illumination source of claim 5, wherein the fall time of the illumination waveform is greater than 200 milliseconds.

7. The illumination source of claim 1, wherein the processor receives an input that represents a level of ambient light.

8. The illumination source of claim 7, wherein the received level of ambient light influences the duty cycle of a pulse-width modulated signal output by the processor.

9. A method for illuminating at least a portion of a document, comprising:
   sensing a level of ambient light;
   determining an illumination waveform to be used to illuminate the at least a portion of the document based on the sensed ambient light level, wherein
   the illumination waveform possesses an illumination rise time that is different from an illumination fall time.

10. The method of claim 9, further comprising decreasing the illumination rise time as a result of the sensing step determining that a high level of ambient light is present.

11. The method of claim 9, further comprising increasing the illumination rise time as a result of the sensing step determining that a low level of ambient light is present.

12. The method of claim 9, further comprising generating a pulse-width modulated signal based on the sensed level of ambient light.

13. The method of claim 12, further comprising controlling voltage to at least one light-emitting diode based on the pulse-width modulated signal.

14. A device for capturing an image, comprising:
   means for sensing a level of ambient light;
   means for adjusting an illumination waveform based on an output from the means for sensing; and
   means for illuminating at least a portion of a document with the illumination waveform, wherein
   the rise and fall times of the illumination waveform are independently controlled.

15. The device of claim 14, wherein the means for illuminating at least a portion of the document comprises step-down circuit coupled to at least one light-emitting diode.

16. The device of claim 14, wherein the rise and fall times are controlled independently by way of at least one MOSFET switch.

17. The device of claim 14, wherein the means for adjusting the illumination waveform includes means for adjusting a rise time and means for adjusting a fall time, wherein the rise time and the fall time are not equal to each other.

18. The device of claim 17, wherein the means for adjusting the illumination waveform includes means for decreasing the illumination rise time and fall time when a high level of ambient light is present.

19. The device of claim 17, wherein the means for adjusting the illumination waveform includes means for increasing the illumination rise time and fall time when a low level of ambient light is present.

* * * * *